Figure 1:
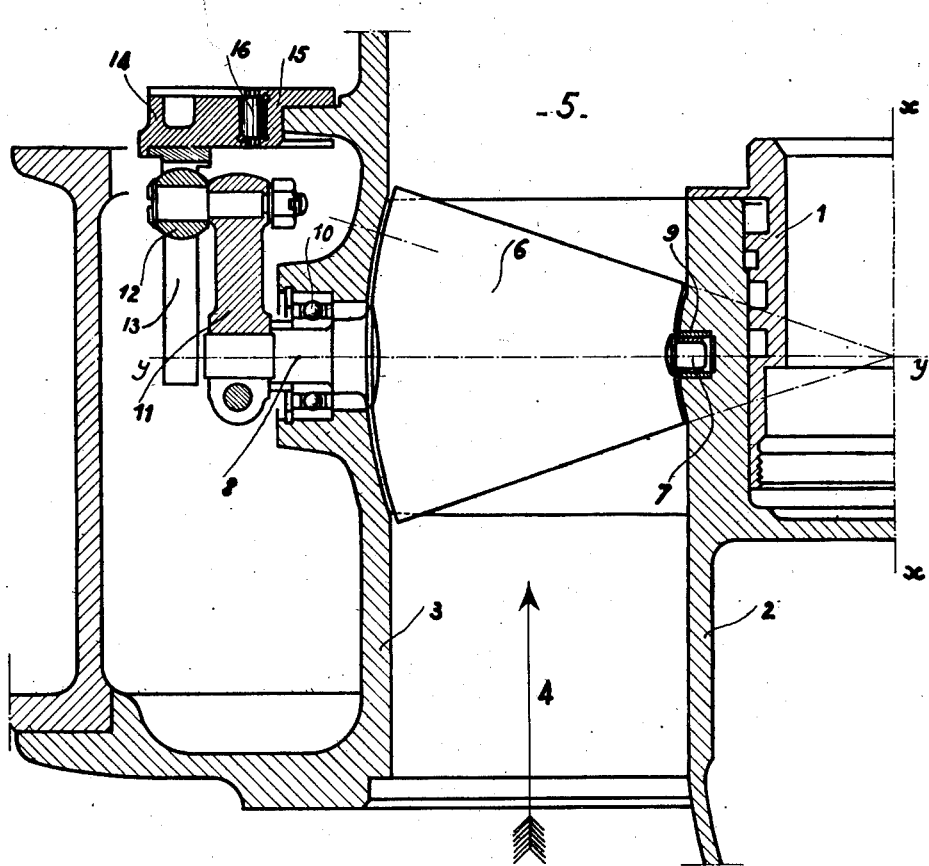

Aug. 12, 1952     L. A. J. BAUGER     2,606,713
ADJUSTABLE INLET DEVICE FOR COMPRESSORS
Filed April 15, 1949     2 SHEETS—SHEET 1

INVENTOR
Louis A. J. Bauger
By Watson, Cole, Grindle & Watson

Aug. 12, 1952 L. A. J. BAUGER 2,606,713
ADJUSTABLE INLET DEVICE FOR COMPRESSORS
Filed April 15, 1949 2 SHEETS—SHEET 2
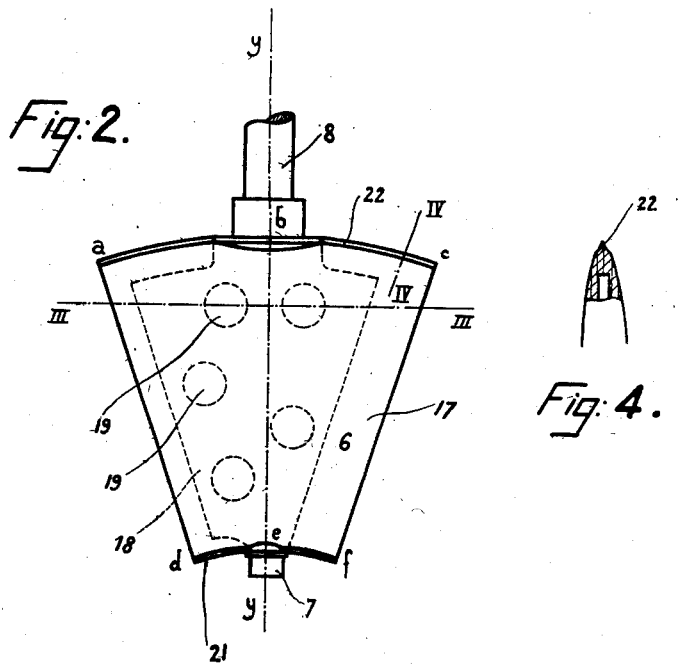
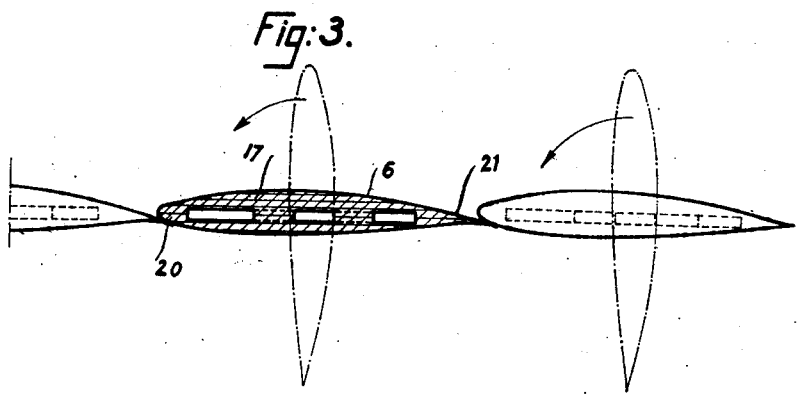
INVENTOR
Louis A. J. Bauger
By Watson, Cole, Grindle & Watson Patented Aug. 12, 1952

2,606,713

UNITED STATES PATENT OFFICE 2,606,713

ADJUSTABLE INLET DEVICE FOR COMPRESSORS

Louis A. J. Bauger, Vanves, France, assignor to Societe Nationale d'Etude et de Construction de Moteurs d'Aviation, Paris, France, a company of France Application April 15, 1949, Serial No. 87,653
In France April 26, 1948

1 Claim. (Cl. 230—114)

As it is already known, the variation of the cross-section area at the inlet passage of a centrifugal compressor is the best way to control the performance of the compressor and to adapt it to various requirements. This adjustment means is particularly suitable for the centrifugal compressors which supercharge explosion engines or internal-combustion engines and particularly aircraft engines.

The devices used up to now for modifying the section of the air inlet of the compressor comprise a set of controllable metal gills or flaps distributed around the shaft end of the suction crown, said flaps being able to close or open wide the air inlet by rotating around their respective axles.

These devices have a few drawbacks.

First as they are made of metal, the flaps, which are in contact with the cold air stream feeding the compressor, are easily covered with ice which strongly sticks to the metal and rather reduces the section of the air inlet.

Further, the stiffness of the metal flaps prevents obtaining a proper tightness when the flaps are closed for throttling down the engine.

A satisfactory stream-lined fineness of the flaps section and a state of the surface as perfect as possible which are necessary for having an air inlet giving the minimum losses, require in the case of metal flaps comparatively complicated, costly manufacturing processes, comprising particularly a polishing. A main object of my invention is to eliminate these various drawbacks and to appreciably improve the working of the adjusting device owing to the fact that the flaps are made of rubber or of a material containing rubber.

Regarding icing, rubber keeps the ice, but it is to be noted that the force of adhesion between ice and rubber is three times smaller than the force of adhesion between ice and a polished metal. In fact rubber being a bad conductor of heat gives a heat dispersion much smaller than a metal and consequently has a lesser tendency to be covered with ice when immersed in wet, cold air. Furthermore, the elastic deformation of the flaps which are produced when they are operated helps the occasional layer of ice to be broken and to fall off.

This same property of elastic deformation enables also a satisfactory tightness between the flaps to be obtained, if the latter are designed in such a manner that when they are closed, the trailing edge of any flap overlaps the leading edge of the neighboring flap. The tightness between the flaps and the metal surfaces of the air duct may also be obtained by providing the flaps, when they are being manufactured, with thin, resilient lips which rub against said metal surfaces.

It is convenient to provide a rubber body forming each flap such that it coats a metal frame ensuring a sufficiently constant shape of the central portion of the flap and also enabling the rigid locking of said flap with metal pivots.

In fact the rubber flaps should have a sufficient strength so that the aerodynamic action of the air does not deform their section, on which the deviation of the fluid is dependent, while having at their edges a resiliency enabling a proper tightness to be obtained.

The combination of rubber and of a coated metal frame enables the above requirements to be met.

The flaps may be made of hot moulded rubber. This enables to rapidly obtain with a great accuracy, well finished surfaces, the aerodynamic section of the flaps at the theoretical dimensions, and also a mass production at a low cost.

Other objects and advantages of the invention will be apparent during the course of the following description.

In the accompanying drawings forming a part of this application and in which like numerals are employed to designate like parts throughout the same:

Figure 1 is an axial half section of an improved air inlet device according to the invention, Figure 2 is an elevational view of a rubber flap showing its metal frame, Figures 3 and 4 are respectively a transverse section and a partial section of this flap taken on line III—III and IV—IV of Figure 2.

In Figure 1, the bearing of the shaft end of the compressor, not shown, is shown at 1, the inside portion of the casing and the cap covering said shaft end is shown at 2, and the outside portion of the compressor casing at 3. Between the surfaces 2 and 3 of the casing is provided an annular opening 4 through which enters the air sucked by the bladed wheel or wheels of the compressor, not shown and arranged at 5. In this opening 4 which is a surface of revolution around the axis $x$—$x$ of the compressor, are distributed a series of flaps 6 which are evenly spaced apart and pivoted on radial, evenly angularly spaced, axes $y$—$y$. These flaps 6 have the shape of a sector. When they are turned perpendicularly to the plane of Figure 1, by rotating on their respective axes $y$—$y$, they come end to end, and thus close the annular air inlet channel 4 section.

The pivoting axes y—y comprise pivots or trunnions 7, 8 rigidly locked with the flaps and respectively rotating in ring bearings 9 arranged in the internal surface 2 of the compressor casing and in ball bearings 10 arranged in the external portion of said casing. On the pivot 8 of each flap is set a lever 11 having a ball joint 12. The ball joints 12 are inserted in castellated portions 13 of an operating ring 14 having its center on aris x—x and able to rotate around this axis on a stationary ring 15 rigidly locked with the casing. Rollers or needles 16 may be placed between both rings.

It is easy to understand that, according to the angular position of ring 14 movable around the axis x—x the flaps 6 are, either wide open as shown in Figure 1, enabling the compressor to suck the maximum air flow, or closed for stopping the compressor from sucking, in the latter case the flaps 6 having a position perpendicular to the plane of Figure 1.

The rotation of the ring 14 around the axis x—x may be easily operated at a certain distance, for instance at the pilot's cockpit by means of a cable or control-rod, etc.

As shown in a more detailed way in Figures 2, 3, each flap 6 is made of a rubber body 17, coated by moulding around a metal frame 18, and whose transverse section has a stream-lined shape of a great fineness.

The frame may be a metal plate lightened by means of holes 19 bored therethrough, which have the advantage to ensure in their boring the mechanical continuity of the rubber body. It may be integral with the two pivots 7 and 8 of the flap, or these pivots may be rigidly locked afterwards on the frame in any convenient way.

The frame is only extended in the central portion of the rubber body. In that way it allows the leading edge 20 and the trailing edge 21 to be resiliently put out of shape, these edges being thus able to be deflected when they bear one upon another at the closing position. In Figure 3, the central flap shown in solid line, and the two adjacent flaps are in the closing position, in order to illustrate the tight contact of the leading and trailing edges which ensures the tightness of the formed air-shutter. The open position of the three flaps is shown in dots and dashes. The edges abc and def of each flap which at their middle are perpendicular to the pivoting axis y—y of the flap are arcs of circumference having their common center on the axis x—x of the compressor. During the rotation of the flaps, these edges describe portions of spheres. The cooperating surfaces on the walls 2 and 3 of the air passage consist also of zones of spheres having a same center, as it is shown in Figure 1.

The provision of a rubber body forming each flap enables a resilient tip 22 (Figure 4) to be obtained by moulding along the edges abc and def, by providing for instance a suitable clearance between the two parts of the mould. This tip has a sufficient length for being applied with a deflection against the spherical portions of the walls 2 and 3, and it sweeps these portions when the flaps are rotating, thus ensuring the tightness between the flaps and the casing.

It is to be understood that the form of the invention herewith shown and described is to be taken as a preferred example of the same and that various changes in the shape, size and arrangement of parts may be resorted to without departing from the spirit of the invention or the scope of the subjoined claim.

What I claim is:

In a compressor, a stationary inlet duct annularly shaped and confined between two surfaces which are of revolution around the axis of the compressor and each of which includes a spherical zone, both zones having their common center on said axis; a set of flaps arranged in said duct between said spherical zones, each of said flaps including an inner metal frame, two opposite trunnions secured thereto and an outer body of resilient material having the shape of a sector of the circular ring which lies between said spherical zones in the plane containing said common center and directed at right angles with respect to said axis, said body being streamlined in planes at right angles with respect to the straight line coaxial with said opposite trunnions so that one edge of said body is rounded as an aerodynamic leading edge while the opposite edge is thin as a trailing edge, both other opposite edges of said body being circular and having radii equal to that of said spherical zones respectively, said trunnions projecting outwardly from said body at an intermediate point of said circular edges; bearing means for said trunnions in said spherical zones for allowing said circular edges to cooperate with said spherical zones, and means for swinging said trunnions in said bearing means, said flaps being arranged and adapted inside said air inlet so that the trailing edge of one of them comes against the leading edge of another in closed position, said body being provided along said circular edges with resilient thin tips adapted to apply against said spherical zones and to sweep said zones during swinging of said flaps.

LOUIS A. J. BAUGER.

REFERENCES CITED

The following references are of record in the file of this patent:

UNITED STATES PATENTS

| Number | Name | Date |
|---|---|---|
| 1,688,736 | Moody | Oct. 23, 1928 |
| 2,077,969 | Smith | Apr. 20, 1937 |
| 2,207,147 | Gibertson | July 9, 1940 |
| 2,291,110 | Sharp | July 28, 1942 |
| 2,383,194 | Hoopes | Aug. 21, 1945 |
| 2,388,208 | Foss | Oct. 30, 1945 |

FOREIGN PATENTS

| Number | Country | Date |
|---|---|---|
| 51,518 | Sweden | Dec. 23, 1919 |
| 500,965 | Great Britain | Feb. 20, 1939 |
| 697,416 | Germany | Oct. 14, 1940 |